US010870737B2

(12) United States Patent
Byun et al.

(10) Patent No.: US 10,870,737 B2
(45) Date of Patent: Dec. 22, 2020

(54) SENSING MATERIAL FOR GAS SENSORS, METHOD OF FABRICATING THE SENSING MATERIAL, GAS SENSOR INCLUDING THE SENSING MATERIAL AND METHOD OF FABRICATING THE GAS SENSOR

(71) Applicant: KOREA INSTITUTE OF SCIENCE AND TECHNOLOGY, Seoul (KR)

(72) Inventors: Young Tae Byun, Seoul (KR); Sun-woo Choi, Seoul (KR); Dong Jin Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 171 days.

(21) Appl. No.: 15/704,183

(22) Filed: Sep. 14, 2017

(65) Prior Publication Data
US 2018/0259472 A1    Sep. 13, 2018

(30) Foreign Application Priority Data

Mar. 13, 2017   (KR) .................. 10-2017-0031259

(51) Int. Cl.
*C08J 5/00* (2006.01)
*C08K 3/04* (2006.01)
(Continued)

(52) U.S. Cl.
CPC .............. *C08J 5/005* (2013.01); *C08J 3/28* (2013.01); *C08K 3/041* (2017.05); *C08K 3/16* (2013.01); *G01N 27/127* (2013.01)

(58) Field of Classification Search
CPC .......... G01N 27/127; C08J 3/28; C08J 5/005; C08K 3/041; C08K 3/16
(Continued)

(56) References Cited

U.S. PATENT DOCUMENTS 7,767,270 B1 *   8/2010   Khare ................. B82Y 30/00
                                             427/294
2008/0113301 A1 *   5/2008   Jung ..................... B82Y 15/00
                                             430/315
(Continued)

FOREIGN PATENT DOCUMENTS

CN          101372330 B  *  3/2011
FR            2940965 A1 *  1/2009
(Continued)

OTHER PUBLICATIONS

Magnetic-fluorescent nanohybrids of carbon nanotubes coated with Eu, Gd Co-doped LaF3 as a multimodal imaging probe, Bingdi Chen et al., Sep. 24, 2011, Journal of Colloidand Interface Science, 367 (2012) 61-66.*
(Continued)

*Primary Examiner* — Marrit Eyassu
(74) *Attorney, Agent, or Firm* — Rabin & Berdo, P.C.

(57) ABSTRACT

A sensing material for gas sensors including carbon nanotubes in which lanthanum fluoride ($LaF_3$) nanoparticles are fixed, a method of fabricating the sensing material, a gas sensor including the sensing material, and a method of fabricating the gas sensor are provided. The gas sensor having an excellent response and excellent selectivity to $F_2$ gas without any electrolytes may be provided using the sensing material. Also, the gas sensor can be useful in measuring a concentration of the $F_2$ gas and minimizing power consumption because the gas sensor may be operated at room temperature without using a heater, and can be used for portable purposes because it is possible to miniaturize the gas sensor.

13 Claims, 13 Drawing Sheets

(51) Int. Cl.
  *C08K 3/16* (2006.01)
  *C08J 3/28* (2006.01)
  *G01N 27/12* (2006.01)
(58) Field of Classification Search
  USPC .................................................. 73/335.02
  See application file for complete search history.

(56) References Cited

U.S. PATENT DOCUMENTS

| | | | | |
|---|---|---|---|---|
| 2009/0029237 A1* | 1/2009 | Yazami | .................. | H01M 4/38 |
| | | | | 429/50 |
| 2010/0221148 A1* | 9/2010 | Oie | .................. | G01N 27/16 |
| | | | | 422/95 |
| 2012/0042713 A1* | 2/2012 | Kim | .................. | C23C 4/18 |
| | | | | 73/31.06 |
| 2012/0080319 A1* | 4/2012 | Myung | .................. | G01N 27/127 |
| | | | | 205/159 |
| 2012/0094030 A1* | 4/2012 | Maedler | .................. | B82Y 30/00 |
| | | | | 427/448 |
| 2015/0337090 A1* | 11/2015 | Sundara | .................. | C08K 9/02 |
| | | | | 73/774 |
| 2017/0016867 A1* | 1/2017 | Chung | .................. | G01N 33/0036 |
| 2018/0313775 A1* | 11/2018 | Iftime | .................. | G01N 33/0009 |
| 2019/0271685 A1* | 9/2019 | Haick | .................. | A61B 5/08 |

FOREIGN PATENT DOCUMENTS

| | | |
|---|---|---|
| KR | 10-0754410 B1 | 8/2007 |
| KR | 10-2011-0123559 A | 11/2011 |

OTHER PUBLICATIONS

Super-Snsitivity of an all solid-state fluorine sensor: mechanistic investigations, Lars Bartholomaus et al., Apr. 27, 2000, Solid State Ionics 132 (2000) 31-37.*

Yu-Lang Sun et al., A Study on Carbon Monoxide Sensor Based on Lanthanum Fluoride Electrolyte, National Cheng Kung University, Dec. 8, 2008.*

Irina v. Zaporotskova et al., Carbon nanotubes:Sensor properties. A review, Modern Electronic Materials, 2(2016) 95-105.*

Lars Bartholomaus et al., "Super-sensitivity of an all solid-state fluorine sensor: mechanistic investigations", Solid State Ionics, 2000, pp. 31-37, vol. 132.

Korean Office Action dated Jul. 20, 2018.

* cited by examiner

US 10,870,737 B2

SENSING MATERIAL FOR GAS SENSORS, METHOD OF FABRICATING THE SENSING MATERIAL, GAS SENSOR INCLUDING THE SENSING MATERIAL AND METHOD OF FABRICATING THE GAS SENSOR

CROSS-REFERENCE TO RELATED APPLICATION

This application claims priority to and the benefit of Korean Patent Application No. 2017-0031259, filed on Mar. 13, 2017, the disclosure of which is incorporated herein by reference in its entirety.

BACKGROUND

1. Field of the Invention

The present invention relates to a sensing material for gas sensors, a method of fabricating the sensing material, a gas sensor including the sensing material, and a method of fabricating the gas sensor, and more particularly, to a sensing material for gas sensors having an excellent response and excellent selectivity to fluorine ($F_2$) gas because the sensing material includes carbon nanotubes in which lanthanum fluoride ($LaF_3$) nanoparticles are fixed, a method of fabricating the sensing material, a gas sensor including the sensing material, and a method of fabricating the gas sensor.

2. Discussion of Related Art

Semiconductor-type gas sensors have received much attention for sensing noxious gases, explosive gases, and toxic gases in various fields such as living environments, industrial safety, health, national defense, and terrorism. In particular, toxic chemical leak accidents which have frequently occurred in Korea and abroad have underlined a need for small semiconductor sensors having high sensitivity and high selectivity at industrial sites.

Various sensing materials such as metal oxide semiconductor materials, polymers, and carbon nanotubes may be used for the semiconductor-type gas sensors. Among these, carbon nanotubes-based gas sensors have advantages such as low cost, downsizing, easy processing, and compatibility with electronic circuits, and thus research on the carbon nanotubes-based gas sensors is being vigorously conducted.

As the prior art regarding such gas sensors, Patent Document 1 (Korean Patent Publication No. 10-2011-0123559) discloses a gas sensor including a substrate, first and second electrodes disposed on the substrate to be spaced apart from each other; and a gas sensing unit coated with a carbon nanotube powder between the first and second electrodes to interconnect the first and second electrodes. According to Patent Document 1, a carbon nanotube gas sensor having improved selectivity to detected gases and improved reaction and recovery rates may be provided. In this case, oxidizing gases, reducing gases, and volatile organic compounds (VOCs) are presented as the detected gases.

However, the gas sensor provided in Patent Document 1 has a drawback in that it does not sense fluorine ($F_2$) gas known as a toxic chemical substance. The $F_2$ gas is widely used in various industrial fields. That is, the $F_2$ gas is used to surface-treat products during a process of fabricating a semiconductor, but is a toxic pollutant which is strongly toxic and corrosive and is harmful to the human body. Therefore, when the $F_2$ gas is spilled at an industrial site, it may have fatal effects on the human body. Accordingly, there has been research conducted on sensors capable of selectively sensing the $F_2$ gas.

For example, Non-patent Document 1 (L. Bartholomaus et al., Super-Sensitivity of an All Solid-State Fluorine Sensor: Mechanistic Investigations, Solid State Ionics 132 (2000) 31-37) discloses a semiconductor sensor using a $LaF_3$ thin film-based metal-insulator semiconductor (MIS) structure.

However, the semiconductor sensor provided in Non-patent Document 1 has a drawback in that the sensor includes an electrolyte solution containing 1 M NaCl and 0.1 M NaF. The gas sensor including such a liquid electrolyte has a problem regarding noxiousness caused by leakage of the electrolyte, and also has a drawback in that it is difficult to miniaturize the sensor because the structure of the sensor is further provided with a space configured to contain an electrolyte solution.

Therefore, there is a need for development of portable miniaturized gas sensors capable of selectively sensing $F_2$ gas without using an electrolyte.

PRIOR-ART DOCUMENTS

Patent Document

Patent Document 1: KR1020110123559 A

Non-Patent Document

Non-patent Document 1: L. Bartholomaus et al., Super-Sensitivity of an All Solid-State Fluorine Sensor: Mechanistic Investigations, Solid State Ionics 132 (2000) 31-37

SUMMARY OF THE INVENTION

The present invention is directed to a sensing material for gas sensors having an excellent response and excellent selectivity to $F_2$ gas, and a method of fabricating the same.

Also, the present invention is directed to a portable miniaturized gas sensor including the sensing material, and a method of fabricating the same.

According to an aspect of the present invention, there is provided a sensing material for gas sensors, which includes carbon nanotubes in which lanthanum fluoride ($LaF_3$) nanoparticles are fixed.

The carbon nanotubes may include single-walled carbon nanotubes (SWCNTs).

The $LaF_3$ nanoparticles may be fixed to inner and/or outer walls of the carbon nanotubes.

The weight ratio of the $LaF_3$ nanoparticles and the carbon nanotubes may be in a range of 9:1 to 1:9.

According to another aspect of the present invention, there is provided a method of fabricating the sensing material. Here, the method of fabricating the sensing material includes (1) mixing $LaF_3$ nanoparticles and carbon nanotubes; and (2) subjecting the mixture obtained in step (1) to a physical method to fabricate the carbon nanotubes in which the $LaF_3$ nanoparticles are fixed.

In this case, the $LaF_3$ nanoparticles and the carbon nanotubes may be mixed at a weight ratio of 9:1 to 1:9, and the mixture obtained in step (1) may be in a powder form. Also, the physical method may be a microwave treatment method.

The method of fabricating the sensing material according to the present invention may further include immersing the carbon nanotubes in which the $LaF_3$ nanoparticles are fixed in step (2) in an organic solvent, followed by agitating, filtering and drying the carbon nanotubes.

In this case, the organic solvent may include one or two or more selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene.

According to still another aspect of the present invention, there are provided a gas sensor including the sensing material and a method of fabricating the same. In this case, the method of fabricating the gas sensor includes forming a network of the sensing material on a substrate; and forming electrodes on the substrate on which the network is formed.

The substrate may include a silicon substrate, preferably a silicon substrate having a silicon oxide film formed on a surface thereof.

The forming of the network of the sensing material on the substrate may be performed using one selected from a dipping method of dipping a substrate in a solution in which the sensing material is dispersed and removing the substrate from the solution or a spraying method of spraying a solution in which the sensing material is dispersed onto a substrate.

The solution in which the sensing material is dispersed may include one or two or more selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene.

Also, the method of fabricating the gas sensor may further include irradiating the solution in which the sensing material is dispersed with ultrasonic waves when the network of the sensing material is formed on the substrate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
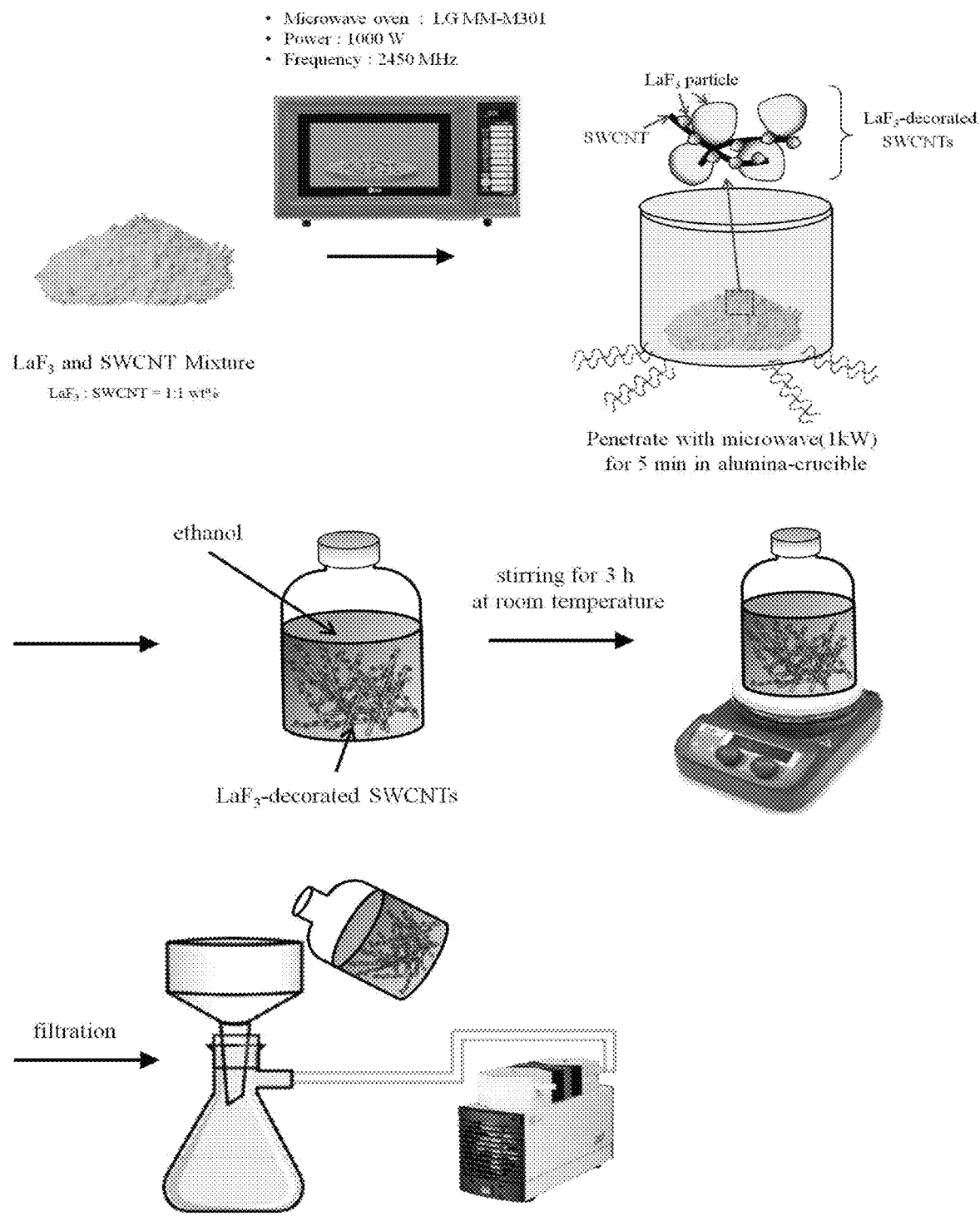
FIG. 1 is a schematic diagram showing a process of fabricating a sensing material according to one exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the scope of the invention.

Unless specifically stated otherwise, all the technical and scientific terms used in this specification have the same meanings as what are generally understood by a person skilled in the related art to which the present invention belongs. In general, the nomenclature used in this specification and the experimental methods described below is widely known and generally used in the related art.

The present invention relates to a sensing material for gas sensors, a method of fabricating the sensing material, a gas sensor including the sensing material, and a method of fabricating the gas sensor.

First, the sensing material for gas sensors according to the present invention will be described below.

The term "sensing material" refers to a material whose resistance varies according to the concentration of a target gas to be sensed. The sensing material for gas sensor according to the present invention includes carbon nanotubes in which lanthanum fluoride ($LaF_3$) nanoparticles are fixed.

The sensing material for gas sensors intended to be provided by the present invention is a material having an excellent response and excellent selectivity to $F_2$ gas. In this case, when the sensing material include the carbon nanotubes alone, the sensing material has a drawback in that the sensing material does not sense $F_2$ gas or has a very poor response and very poor selectivity to the $F_2$ gas. On the other hand, when $LaF_3$ is intended to be used alone as the sensing material to sense $F_2$ gas, the sensing material has a problem in that the sensing material has to include an electrolyte as a component of a gas sensor, as known in the prior-art documents. The present inventors have conducted ardent research to solve the above problems, and found that a gas sensor having an excellent response and excellent selectivity to $F_2$ gas without any electrolyte may be provided when $LaF_3$ nanoparticles in a powder form are fixed in carbon nanotubes using a physical method and the carbon nanotubes in which the $LaF_3$ nanoparticles are fixed are used as a sensing material. Therefore, the present invention has been completed based on these facts.

In general, carbon nanotubes (CNTs) are known to have a current density 1,000 times higher than a copper wire and have carrier mobility 10 times higher than silicon. For this reason, the carbon nanotubes have been often used as materials for high-response/high-speed electronic devices. Also, high-response chemical sensors and/or biosensors may be fabricated using a change in electrical conductivity caused by an interaction between the carbon nanotubes and a target material to be sensed. The carbon nanotubes may also be applied to portable sensors because sensors using the carbon nanotubes may be operated at room temperature unlike conventional metal oxide semiconductor sensors and the carbon nanotubes are a nano-sized material, which makes it possible to reduce the size of the sensors.

The carbon nanotubes used in the sensing material of the present invention may include one or two or more selected from the group consisting of single-walled carbon nanotubes, double-walled carbon nanotubes, and multi-walled carbon nanotubes, and may preferably include single-walled carbon nanotubes (SWCNTs). This is because the single-walled carbon nanotubes exhibit superior performance in terms of response and reaction rates, compared to the multi-walled carbon nanotubes.

The plurality of carbon nanotubes included in the sensing material has a network structure. Here, $LaF_3$ nanoparticles are fixed in such carbon nanotubes. In this case, the $LaF_3$ nanoparticles may be fixed to inner and/or outer walls of the carbon nanotubes. For example, in a physical treatment process of fixing the $LaF_3$ nanoparticles in the carbon nanotubes, the $LaF_3$ nanoparticles are fixed to outer walls of the carbon nanotubes. Among the $LaF_3$ nanoparticles, some microparticles having a very large particle size penetrate into the carbon nanotubes so that the microparticles can be fixed to inner walls of the carbon nanotubes.

The $LaF_3$ nanoparticles serve as a catalyst in allowing the carbon nanotubes to sense $F_2$ gas. In this case, a catalytic reaction may be activated as the nanoparticles have a smaller size and are present in a separate form. The size of the nanoparticles may be in a range of several nanometers (nm) to several hundreds of nanometers, preferably in a range of 1 to 200 nm, more preferably 5 to 100 nm, and most preferably in a range of 20 to 60 nm. When the size of the nanoparticles falls within this range, it is desirable because a change in electric resistance due to a contacted gas may be checked more sensitively.

As such, when the network of the carbon nanotubes in which the $LaF_3$ nanoparticles are fixed is used as the sensing material, the present invention may provide a gas sensor having a very good response (i.e., sensitivity) and selectivity and excellent repeatability even when the gas sensor reacts with a trace of $F_2$ gas.

The weight ratio of the $LaF_3$ nanoparticles and the carbon nanotubes may be in a range of 9:1 to 1:9, preferably in a range of 3:1 to 1:1, and more preferably 1:1. When the $LaF_3$ nanoparticles are included at an excessive amount exceeding an upper limit of this range, the entire surfaces of the carbon nanotubes may be covered with the nanoparticles, resulting in a degraded response and a degraded reaction rate of the gas sensor. On the other hand, when the $LaF_3$ nanoparticles are included at a small amount less than a lower limit of this range, an effect of the $LaF_3$ nanoparticles as the catalyst may be degraded.

Meanwhile, the present invention provides a method of fabricating the sensing material, and FIG. 1 schematically shows a process of fabricating the sensing material. The method of fabricating the sensing material will be described below with reference to FIG. 1.

Specifically, the method of fabricating the sensing material according to the present invention includes (1) mixing $LaF_3$ nanoparticles and carbon nanotubes; and (2) subjecting the mixture obtained in step (1) to a physical method to fabricate the carbon nanotubes in which the $LaF_3$ nanoparticles are fixed.

In step (1), the $LaF_3$ nanoparticles and the carbon nanotubes may be mixed at a weight ratio of 9:1 to 1:9, preferably mixed at a weight ratio of 3:1 to 1:1, and more preferably at a weight ratio of 1:1. In this case, when the $LaF_3$ nanoparticles are mixed at an excessive amount exceeding an upper limit of this range, the entire surfaces of the carbon nanotubes may be covered with the nanoparticles, resulting in a degraded response and a degraded reaction rate of the gas sensor. On the other hand, when the $LaF_3$ nanoparticles are mixed at a small amount less than a lower limit of this range, an effect of the $LaF_3$ nanoparticles as the catalyst may be degraded.

The mixture obtained in step (1) may be in a powder form. Also, a microwave treatment method may be used as the physical method in step (2). In this case, after the $LaF_3$ nanoparticles and the carbon nanotubes are simply mixed in a powder phase, the $LaF_3$ nanoparticles may be fixed in the carbon nanotube, for example, using a microwave oven, etc. Therefore, the sensing material that may be used for gas sensors for sensing $F_2$ may be easily fabricated.

Specifically, the microwave treatment conditions are described as follows. The frequency is 2.45 GHz, the power has a maximum of 1,000 W and may be adjusted to 10 levels, and the time may not exceed a maximum of 5 minutes. When the $LaF_3$ nanoparticles are fixed in the carbon nanotubes using a microwave treatment method under such conditions, the method is economical due to high efficiency with respect to the electrical energy consumption, and the $LaF_3$ nanoparticles may be effectively fixed in the carbon nanotubes in a short time using a simple method.

The method of fabricating the sensing material according to the present invention may further include immersing the carbon nanotubes in which the $LaF_3$ nanoparticles are fixed in step (2) in an organic solvent, followed by agitating, filtering and drying the carbon nanotubes. When the carbon nanotubes are subjected to agitation and filtering processes in this way, the free $LaF_3$ nanoparticles remaining without being fixed in the carbon nanotubes may be removed, resulting in an improved response of the sensor.

The organic solvent may include one or two or more selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene. Preferably, ethanol may be used.

Also, the present invention provides a gas sensor including the sensing material. As described above, the gas sensor according to the present invention may have a very excellent response and very excellent selectivity to $F_2$ gas, and may also be used to measure a concentration of the $F_2$ gas.

A method of fabricating such a gas sensor includes forming a network of the sensing material on a substrate; and forming electrodes on the substrate on which the network is formed. Hereinafter, one exemplary embodiment of the method of fabricating the gas sensor according to the present invention will be described in detail with reference to FIG. 2.

(a) Forming Network of Sensing Material on Substrate

First, a substrate is prepared. A Group III-V compound semiconductor material such as Si, GaAs, InP, InGaAs, etc., glass, an oxide thin film, a dielectric thin film, a metal thin film, and the like may be used as a material used for the substrate, but the present invention is not limited thereto. Preferably, the substrate may include a silicon substrate, or may include a silicon substrate having an insulating film formed on a surface thereof, for example, a silicon substrate (a $SiO_2$/Si substrate) having a silicon oxide ($SiO_2$) film formed on a surface thereof.

The insulating film may be formed on the substrate using a method such as a thermal oxidation method, a deposition method, a spin coating method, etc., but the present invention is not limited thereto. In the case of the thermal oxidation method, a thermal insulating film may be formed by heating the substrate to a temperature of 1,000° C. or higher using a heat diffusion furnace. In the case of the deposition method, a $SiO_2$ thin film may be formed using plasma-enhanced chemical vapor deposition (PECVD) or low-pressure CVD (LPCVD). In the case of the spin coating method, a $SiO_2$ thin film may be formed on the silicon substrate using silica-on-glass (SOG). The insulating film may have a thickness of 120 to 300 nm.

Next, a network of the sensing material is formed on the substrate. The sensing material used in the present invention includes carbon nanotubes in which the $LaF_3$ nanoparticles are fixed, and the type of the carbon nanotubes and the size of the $LaF_3$ nanoparticle are as described above.

Figure 2:
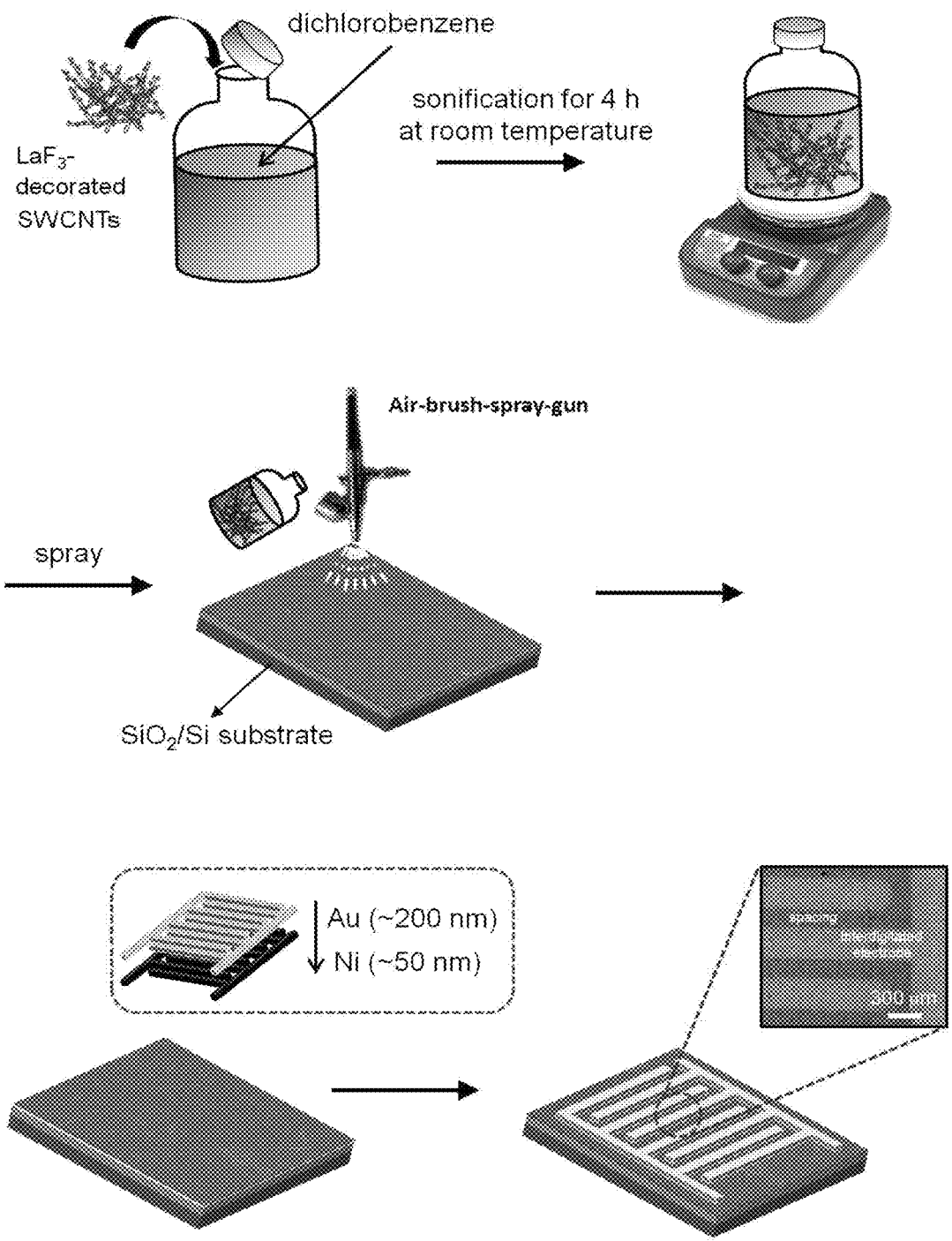
FIG. 2 is a schematic diagram showing one exemplary embodiment in which a gas sensor is fabricated using the sensing material fabricated in FIG. 1.

The forming of the network of the sensing material on the substrate may be performed using one selected from a dipping method of dipping a substrate in a solution in which the sensing material is dispersed and removing the substrate from the solution or a spraying method of spraying a solution in which the sensing material is dispersed onto a substrate. To uniformly disperse the sensing material, the spraying method may be preferred. Such a spraying method may be carried out in an argon (Ar) atmosphere in order to prevent an oxidation reaction of the carbon nanotubes with oxygen. The use of the spraying method is shown in FIG. 2.

The solution in which the sensing material is dispersed may include one or more solvents selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene.

Also, the method of fabricating the gas sensor may further include irradiating the solution in which the sensing material is dispersed with ultrasonic waves. As a result, the sensing material may be uniformly dispersed in the solution.

The concentration of the sensing material in the solution in which the sensing material is dispersed may be in a range of 0.01 to 0.50 mg/mL. When the concentration is less than 0.01 mg/mL, the sensing material may not normally serve as the sensor due to a very small amount of the adsorbed sensing material. On the other hand, when the concentration is greater than 0.50 mg/mL, a long period of time is required to disperse the sensing material, the response of the sensor may be degraded, and an excessive amount of the sensing material may be consumed, resulting in increased manufacturing costs.

(b) Forming Electrodes

This step includes forming electrodes on the substrate in which the network of the sensing material is formed in step (a). Here, the electrodes may be a source electrode and a drain electrode.

The electrodes may be formed using a conventional photolithography process. For example, a metal or metal oxide thin film is formed on the substrate that has underwent the aforementioned processes. Thereafter, an exposure process is performed on a top surface of the metal or metal oxide thin film to expose a region on which a source electrode and a drain electrode are formed (or a region other than the source electrode and the drain electrode). Then, the metal or metal oxide thin film is etched using a conventional etching method, and a photoresist is finally removed with a photoresist stripper to form the source and drain electrodes made of the metal and metal oxide.

Hereinafter, the present invention will be described in further detail with reference to Examples thereof, but the present invention is not limited thereto.

Example 1

<Fabrication of Sensing Material (See FIG. 1)>

Single-walled carbon nanotubes (SWCNTs) (commercially available from Nanointegris, SuperPure SWNTs in a powder form) and $LaF_3$ nanoparticles (commercially available from US Research Nanomaterials, Inc, "Lanthanum trifluoride powder, 20-60 nm" in a powder form) were mixed at a weight ratio of 1:1. In this case, the size of the $LaF_3$ nanoparticles was in a range of 20 to 60 nm.

Next, 2 mg of the mixed powder of the SWCNTs and the $LaF_3$ nanoparticles was put into an alumina crucible, and the alumina crucible was put into a microwave oven (LG, MM-M301), and treated with microwaves for 5 minutes. In this case, the microwave treatment was carried out under conditions of a power of 1 kW and a frequency of 2,450 MHz, and the $LaF_3$ nanoparticles were fixed in the SWCNTs through the microwave treatment.

Subsequently, 2 mg of the SWCNTs in which the $LaF_3$ nanoparticles were fixed were immersed in 100 mL of ethanol, agitated at room temperature for 3 hours, filtered, and then dried at room temperature. The sensing material (hereinafter referred to as a "$LaF_3$-SWCNT composite"), from which the $LaF_3$ nanoparticles remaining without being fixed in the SWCNTs were removed, was obtained through the agitation, filtering and drying processes <Fabrication of Gas Sensor (See FIG. 2)>

A $SiO_2$/Si substrate in which a silicon oxide insulating film ($SiO_2$) was formed on a silicon substrate was prepared. In this case, the insulating film had a thickness of 300 nm.

Next, 1 mg of the $LaF_3$-SWCNT composite was added to 50 mL of 1,2-dichlorobenzene ($C_6H_4Cl_2$, Sigma-Aldrich Corp.), and the resulting mixture was sonicated at room temperature for 4 hours to prepare a suspension in which the $LaF_3$-SWCNT composite was uniformly dispersed.

Subsequently, to form a network of the $LaF_3$-SWCNT composite on a substrate, 4 mL of the suspension was sprayed onto the $SiO_2$/Si substrate using an air-brush spray gun (commercially available from Mr. Hobby, Model name: PS-770) equipped with a 0.18 mm nozzle. The networked $LaF_3$-SWCNT composite was heated to 180° C. on a hot plate so that the $LaF_3$-SWCNT composite was successfully adsorbed onto the substrate.

Then, a source electrode and a drain electrode were formed on the heat-treated substrate according to a conventional photolithography process to fabricate a gas sensor. In this case, Ni (50 nm)/Au (200 nm) electrodes were used as the source electrode and the drain electrode.

Comparative Example 1

A $SiO_2$/Si substrate in which a silicon oxide insulating film ($SiO_2$) was formed on a silicon substrate was prepared. In this case, the insulating film has a thickness of 300 nm.

Next, 1 mg of the SWCNTs were added to 50 mL of 1,2-dichlorobenzene ($C_6H_4Cl_2$, Sigma-Aldrich Corp.), and then sonicated at room temperature for 4 hours to prepare a suspension in which the SWCNTs were uniformly dispersed.

Subsequently, to form a network of the SWCNTs on a substrate, 4 mL of the suspension was sprayed onto the SiO$_2$/Si substrate using an air-brush spray gun (commercially available from Mr. Hobby; Model name: PS-770) equipped with a 0.18 mm nozzle. The networked SWCNTs were heated to 180° C. on a hot plate so that the SWCNTs were successfully adsorbed onto the substrate.

Then, a source electrode and a drain electrode were formed on the heat-treated substrate according to a conventional photolithography process to fabricate a gas sensor. In this case, Ni (50 nm)/Au (200 nm) electrodes were used as the source electrode and the drain electrode.

Evaluation Example 1: Analysis of Response According to Sensing Material

Each of the gas sensors fabricated in Example 1 and Comparative Example 1 was connected to a direct current (DC) power supply (KEITHLEY 2400), and fluorine (F$_2$) gas was allowed to flow thereto using a mass flow controller. Thereafter, a change in resistance of a sensor body due to the gas flow was measured while applying a constant DC power source.

The gas response of the sensor to the F$_2$ gas was calculated using the following Equation 1. The results are listed in the following Table 1. In this case, the response measurement was performed at room temperature at a gas concentration of 5 ppm.

$$\text{Response (\%)} = (\Delta R/R_0) \times 100 \quad \text{Equation (1)}$$

In Equation (1), $R_0$ represents an initial resistance value when there is no reactive gas, and $\Delta R$ represents a value obtained by subtracting the $R_0$ value from a resistance value when there is a reactive gas.

TABLE 1

| | Weight ratio of SWCNTs:LaF$_3$ nanoparticles | Response (%) |
|---|---|---|
| Example 1 | 1:1 | 12.89 |
| Comparative Example 1 | 1:0 | No response |

Looking at Table 1, it can be seen that the gas sensor of Example 1 in which the LaF$_3$-SWCNT composite was used as the sensor material had an excellent response to the F$_2$ gas, but the gas sensor of Comparative Example 1 in which the SWCNTs were used alone had no response to the F$_2$ gas.

Evaluation Example 2: EDS and XRD Analyses

The sensing material fabricated in Example 1 was subjected to Energy dispersive X-ray spectroscopy (EDS) and X-ray diffraction (XRD) analysis. The results are shown in FIGS. 3 and 4, respectively.

Figure 3:
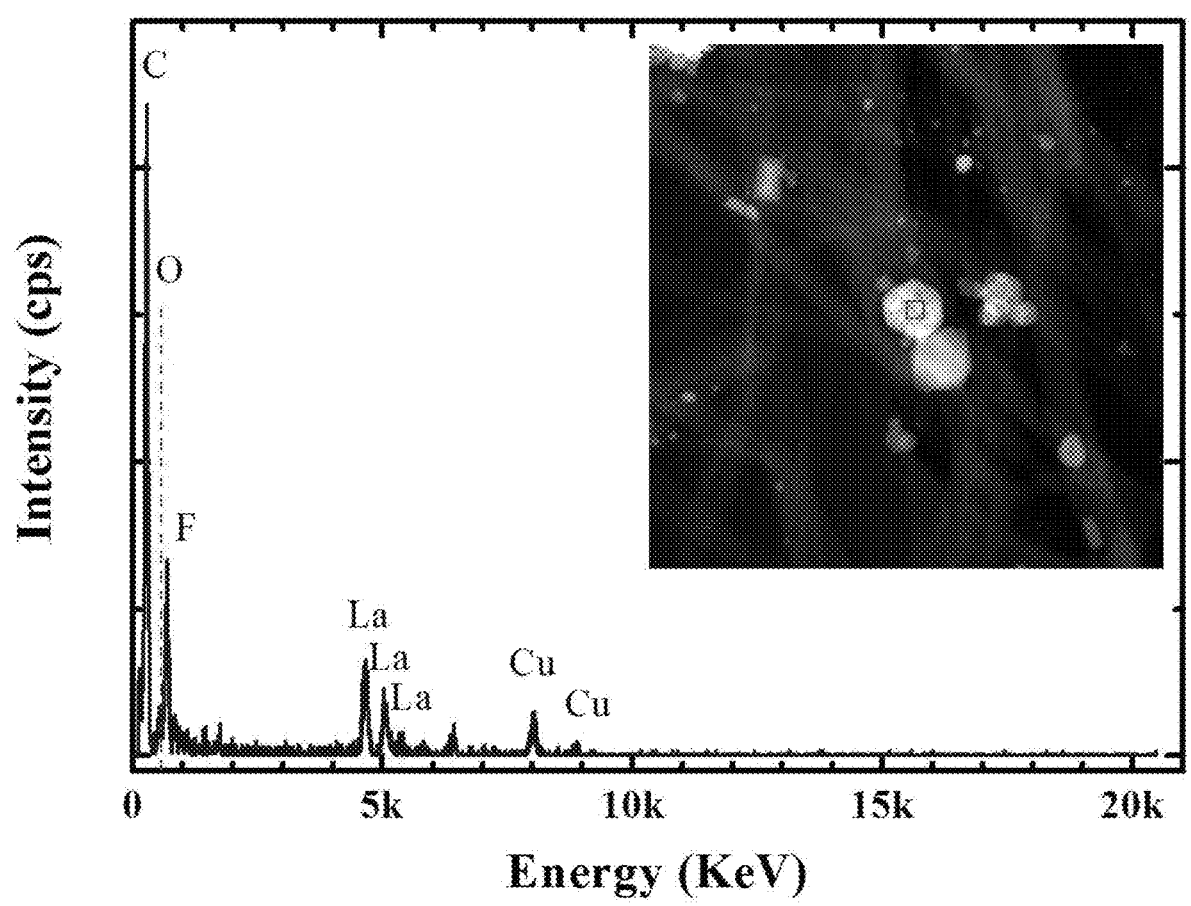
FIG. 3 shows EDS analysis results of a sensing material fabricated in Example 1.
Figure 4:
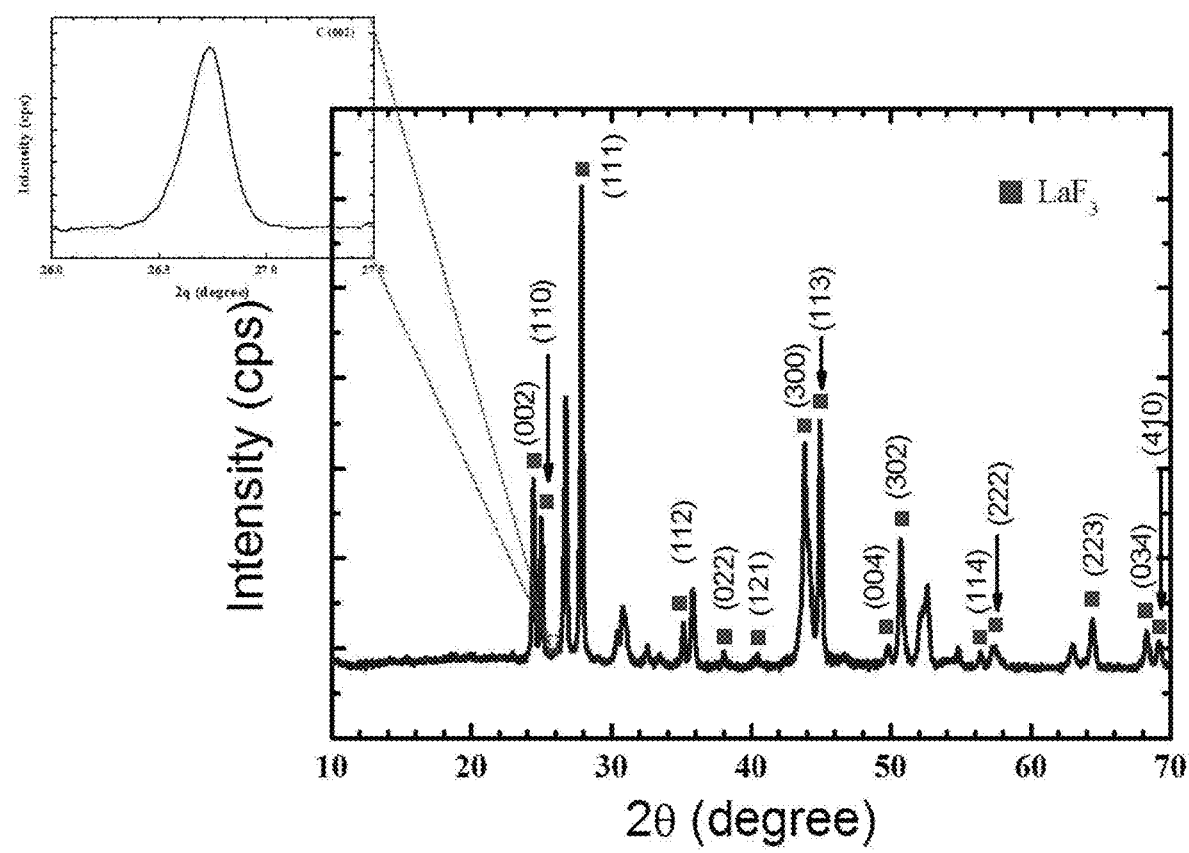
FIG. 4 shows XRD analysis results of the sensing material fabricated in Example 1.

FIG. 3 shows the EDS analysis results of the sensing material fabricated in Example 1 and a FE-SEM image of the sensing material. Here, the EDS analysis results are obtained by analyzing a region indicated by a red square in the image. Referring to FIG. 3, it can be seen that the sensing material included fluorine (F) and lanthanum (La) elements together with carbon (C) constituting the carbon nanotubes. Referring to FIG. 4, it can be also seen that the sensing material included particles having a crystal structure of LaF$_3$.

Evaluation Example 3: FT-SEM and TEM Analyses

The sensing material (LaF$_3$-SWCNT composite) fabricated in Example 1 was subjected to field emission scanning electron microscopy (FE-SEM) and transmission electron microscopy (TEM). The results are shown in FIGS. 5 and 6, respectively.

Figure 5:
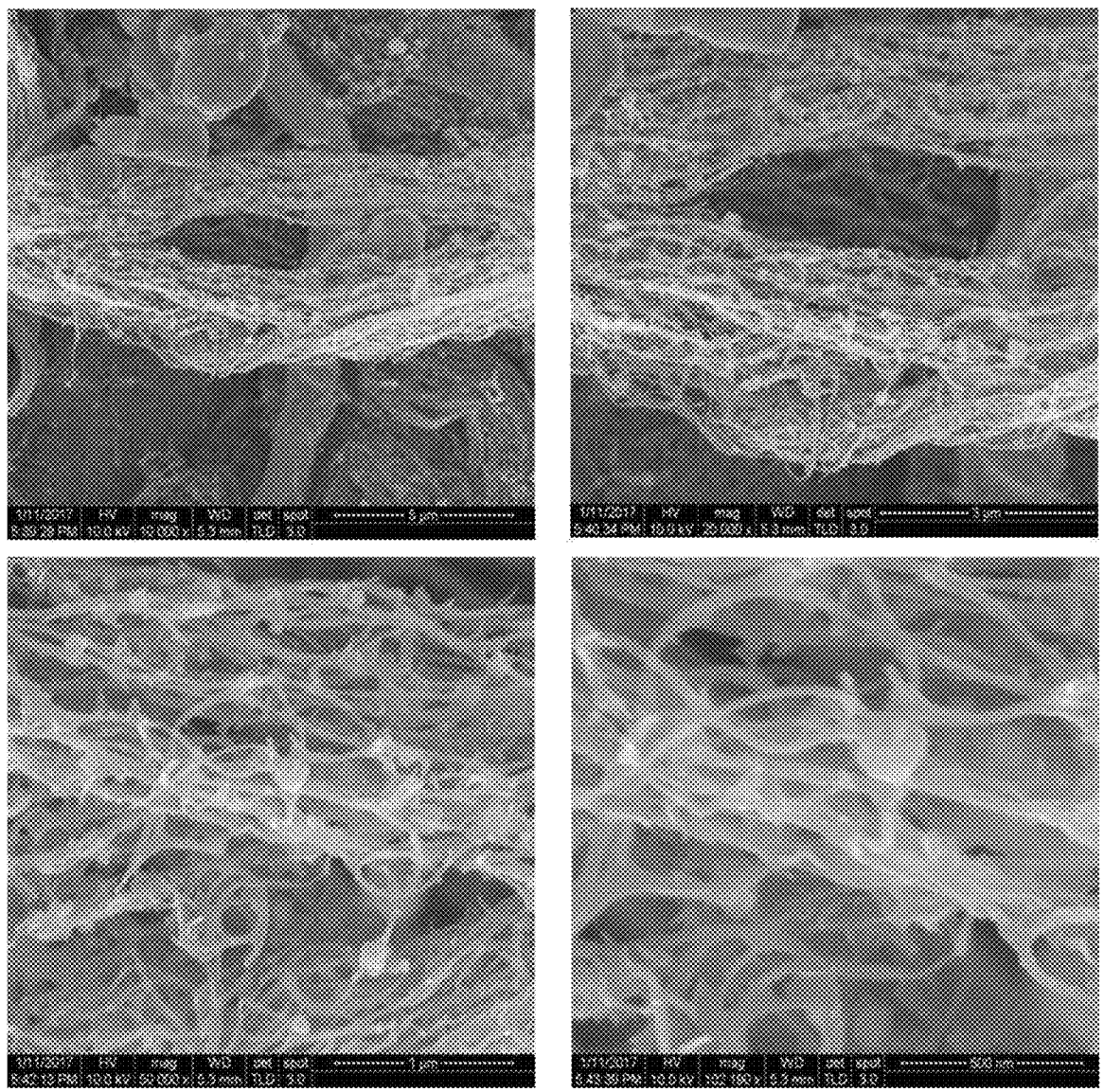
FIG. 5 shows an FE-SEM image of the sensing material fabricated in Example 1.
Figure 6:
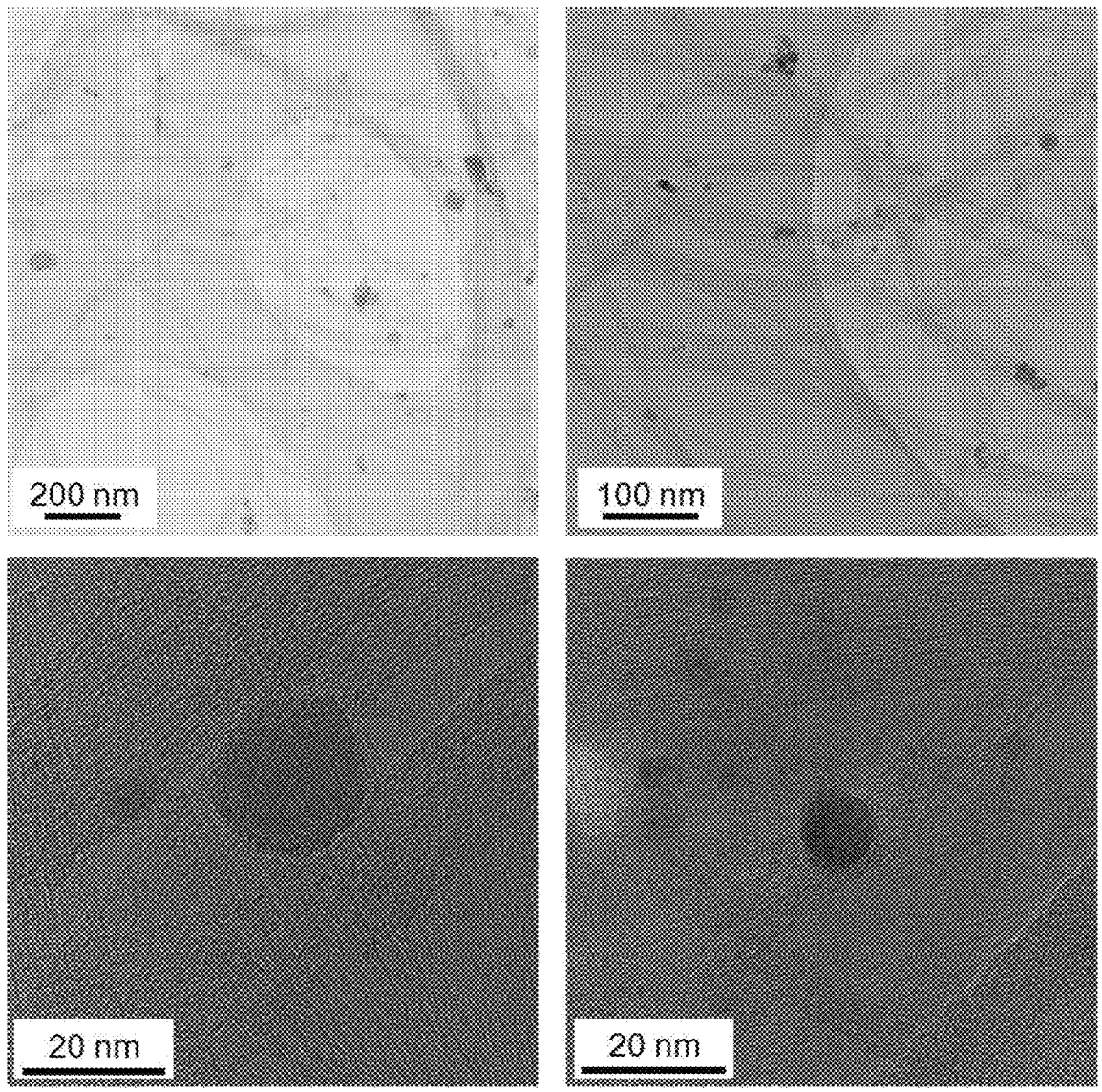
FIG. 6 shows a TEM image of the sensing material fabricated in Example 1.

Referring to FIGS. 5 and 6, it can be seen that the nanoparticles were fixed in the carbon nanotubes. Referring to the analysis contents of Evaluation Example 2 together with FIGS. 5 and 6, it can be seen that the nanoparticles were the LaF$_3$ nanoparticles, and the sensing material fabricated in Example 1 included the SWCNTs in which the LaF$_3$ nanoparticles were fixed. However, referring to FIG. 6, particles having a size smaller than the LaF$_3$ nanoparticles (20 to 60 nm) used in Example 1 were observed, indicating that some of the LaF$_3$ nanoparticles were split during a microwave treatment process.

Evaluation Example 4: Characterization of Gas Sensors

The gas sensor fabricated in Example 1 was connected to a direct current (DC) power supply (KEITHLEY 2400), and fluorine (F$_2$), chlorine (Cl$_2$), nitrogen monoxide (NO), carbon monoxide (CO) and ammonia (NH$_3$) gases were allowed to flow thereto using a mass flow controller. Thereafter, changes in resistance of a sensor body due to the gas flow were measured while applying a constant DC power source. The measurement results are shown in FIGS. 7 and 9 to 12. Types and concentrations of test gases are shown in each of drawings. All measurements were performed at room temperature.

Figure 7:
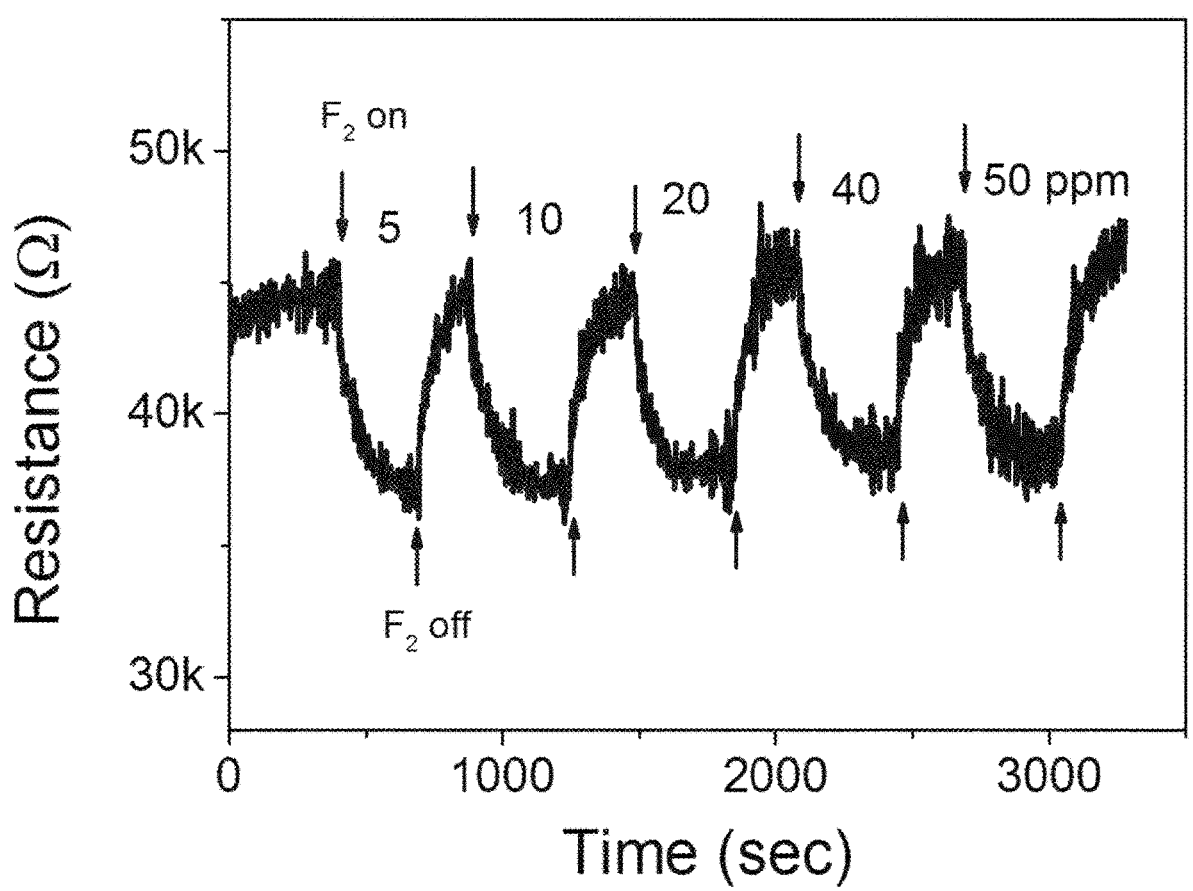
FIG. 7 is a graph illustrating resistance values measured over time when 5 to 50 ppm of $F_2$ gas is applied to the gas sensor fabricated in Example 1.

FIG. 7 is a graph illustrating resistance values measured over time when 5 to 50 ppm of F$_2$ gas is applied to the gas sensor fabricated in Example 1. Referring to FIG. 7, it can be seen that the gas sensor fabricated in Example 1 was able to stably sense the F$_2$ gas even when the gases were present at a low concentration of a ppm level at room temperature.

Figure 8:
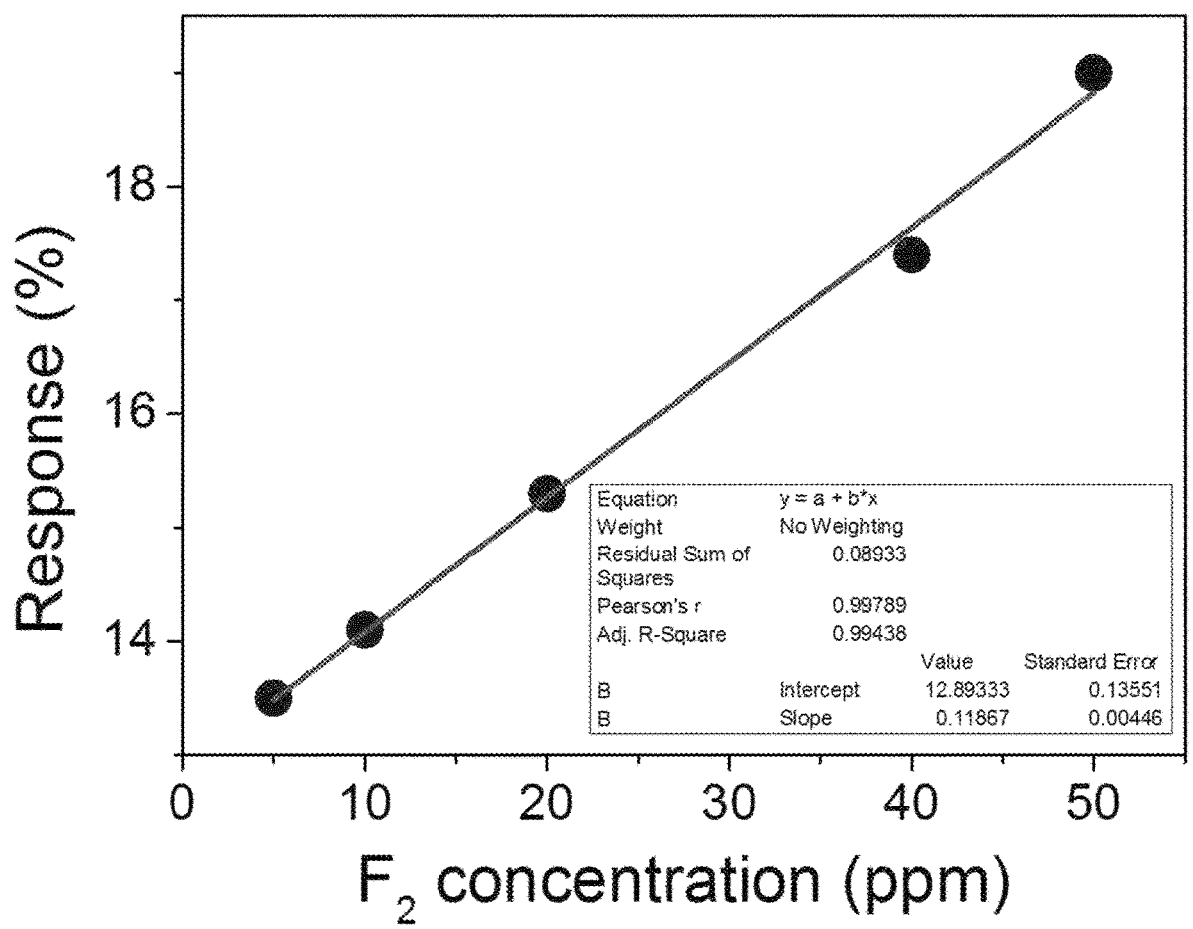
FIG. 8 is a graph illustrating responses with respect to the concentration of $F_2$ gas when 5 to 50 ppm of $F_2$ gas is applied to the gas sensor fabricated in Example 1.
Figure 9:
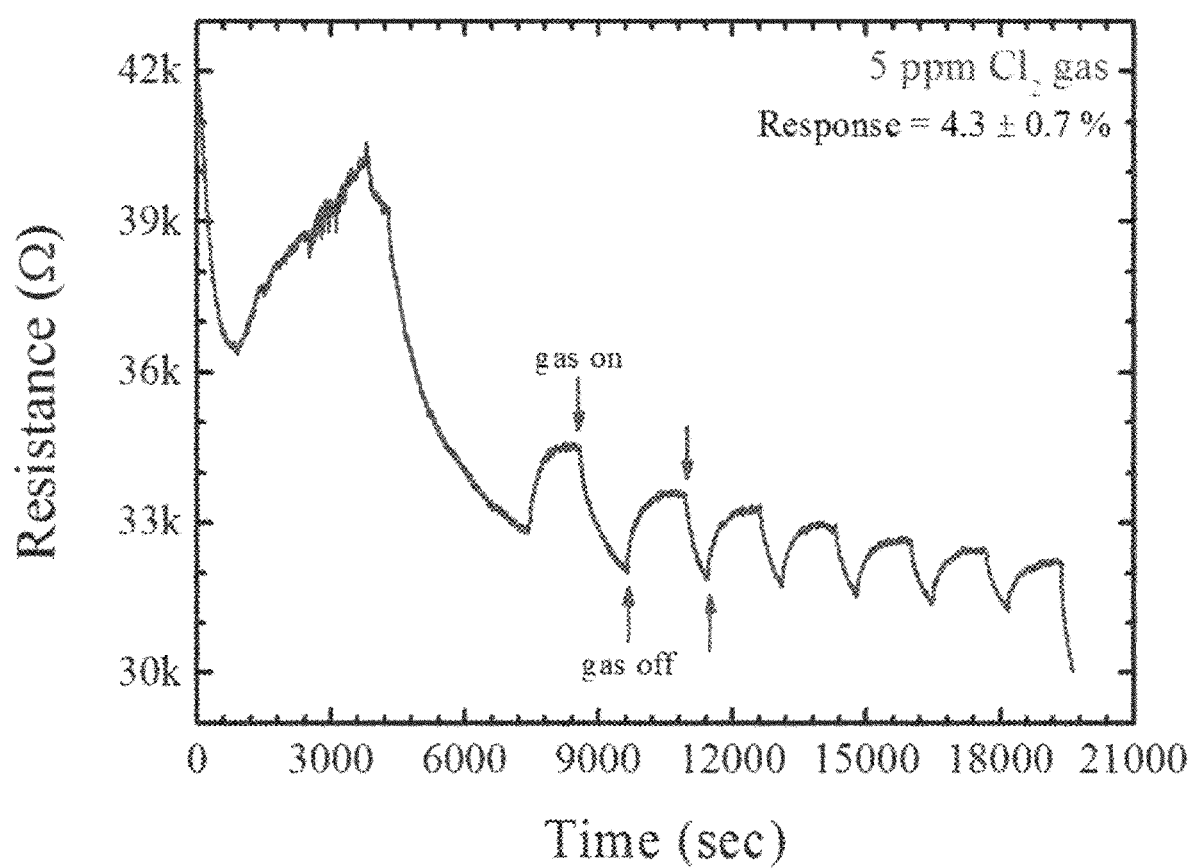
FIG. 9 is a graph illustrating resistance values measured over time when 5 ppm of $Cl_2$ gas is applied to the gas sensor fabricated in Example 1.
Figure 10:
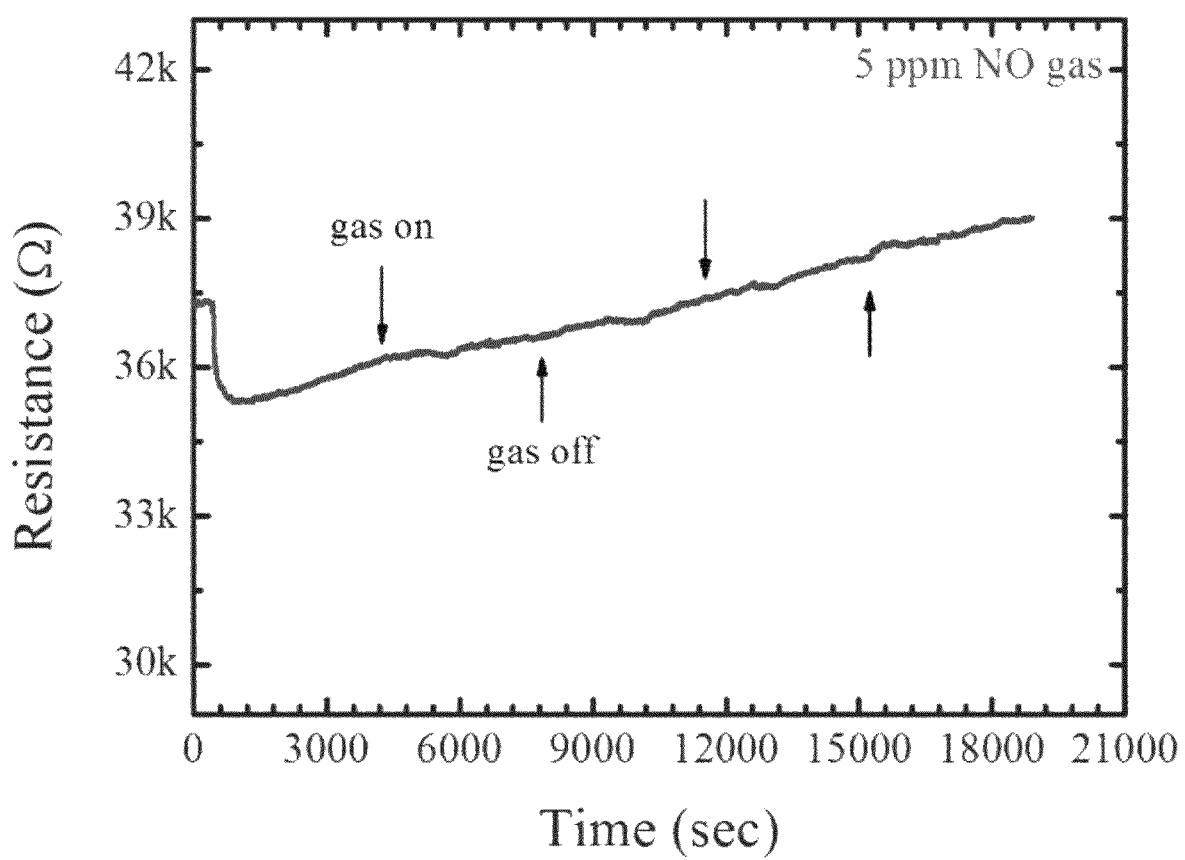
FIG. 10 is a graph illustrating resistance values measured over time when 5 ppm of NO gas is applied to the gas sensor fabricated in Example 1.
Figure 11:
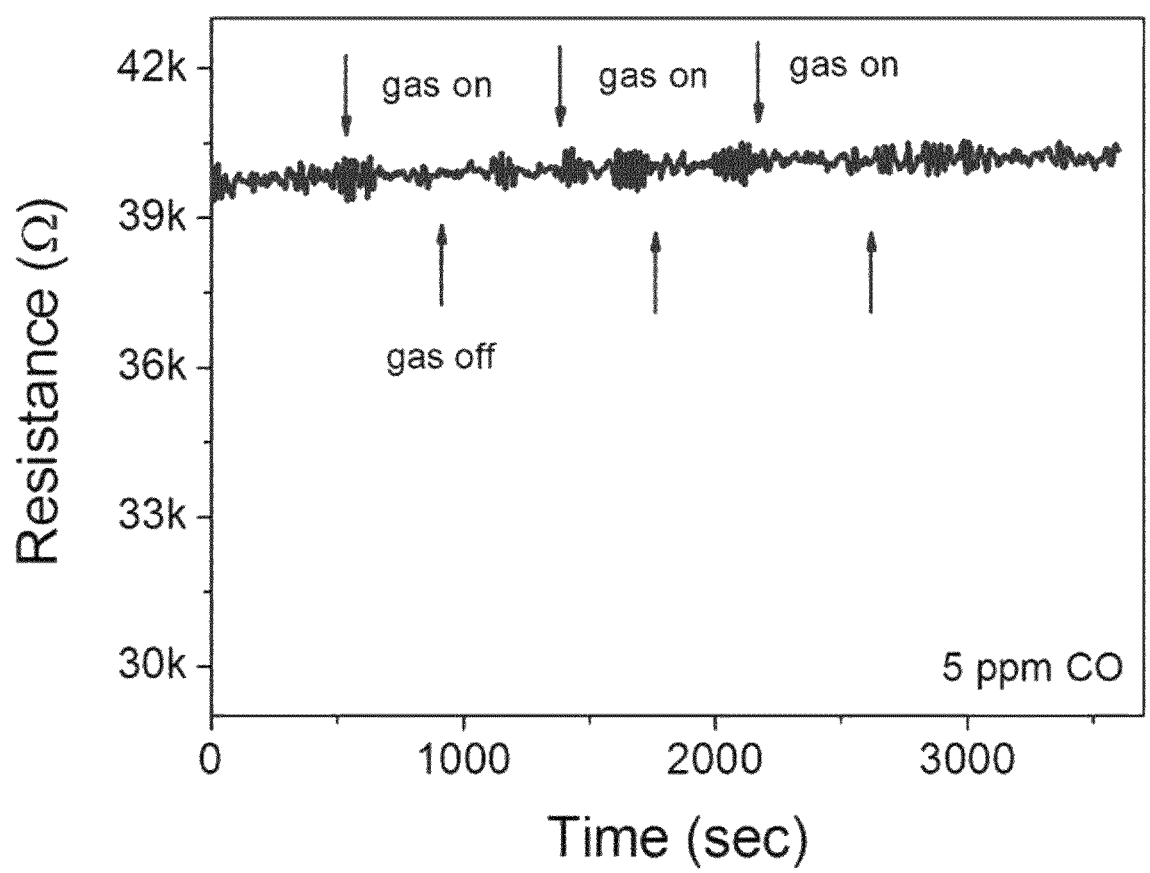
FIG. 11 is a graph illustrating resistance values measured over time when 5 ppm of CO gas is applied to the gas sensor fabricated in Example 1.
Figure 12:
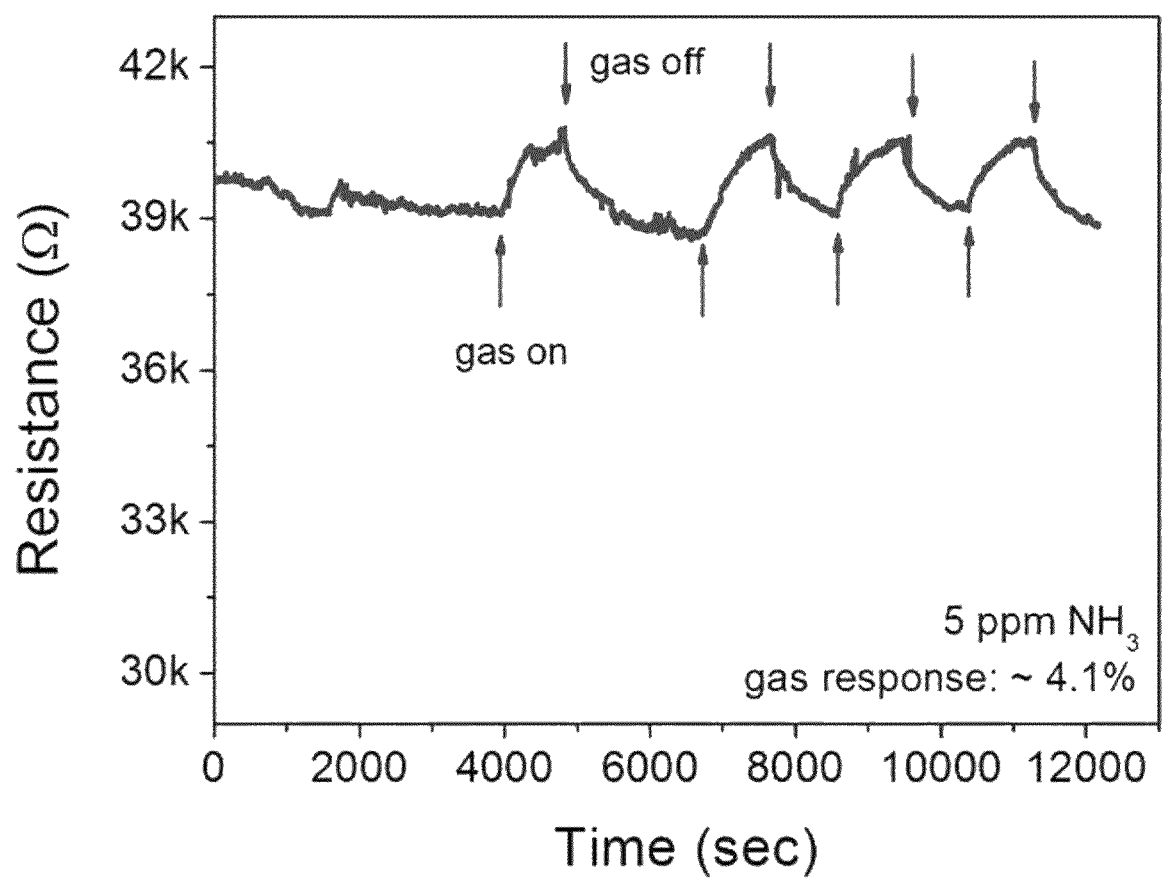
FIG. 12 is a graph illustrating resistance values measured over time when 5 ppm of $NH_3$ gas is applied to the gas sensor fabricated in Example 1.

Also, FIG. 8 is a graph illustrating responses with respect to the gas concentration when 5 to 50 ppm of F$_2$ gas is applied to the gas sensor fabricated in Example 1. In this case, the response is a value calculated according to the aforementioned Equation (1). Referring to FIG. 8, it can be seen that the response increased in proportion to the increasing concentration of F$_2$ gas. Therefore, the concentration of F$_2$ gas was able to be calculated from the response values measured by the gas sensor fabricated according to the present invention. That is, the gas sensor fabricated according to the present invention was able to stably and selectively sense the F$_2$ gas, and also able to measure the concentration of the sensed F$_2$ gas.

In addition, referring to FIGS. 9 to 12, it can be seen that the gas sensor fabricated in Example 1 was able to sense Cl$_2$ and NH$_3$ gases, but unable to sense NO and CO gases.

Figure 13:
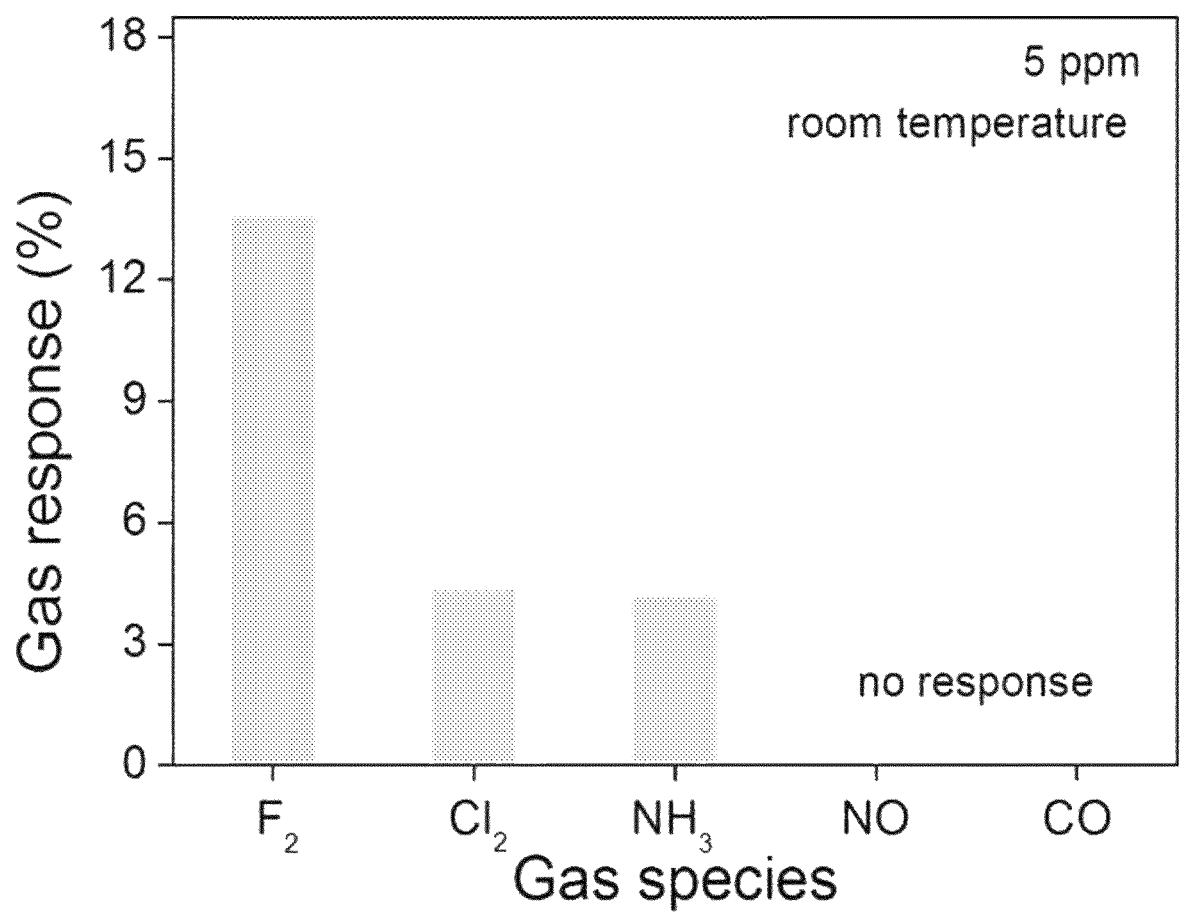
FIG. 13 is a graph illustrating a comparison of Gas responses with respect to the respective types of gases when 5 ppm of $F_2$, $Cl_2$, CO, NO and $NH_3$ gases are applied to the gas sensor fabricated in Example 1.

Meanwhile, the gas responses of the sensor to the fluorine (F$_2$), chlorine (Cl$_2$), nitrogen monoxide (NO), carbon monoxide (CO) and ammonia (NH$_3$) gases were calculated according to Equation (1), and the responses to the respective gases were compared. The results are shown in FIG. 13. In this case, the response measurement was performed at a gas concentration of 5 ppm. Referring to FIG. 13, it can be seen that the gas sensor fabricated according to the present invention especially had a remarkably high response to the F$_2$ gas, compared to the responses to the Cl$_2$, NO, CO and NH$_3$ gases.

According to the present invention, the gas sensor having an excellent response and excellent selectivity to F$_2$ gas without any electrolytes can be provided when the carbon nanotubes in which the LaF$_3$ nanoparticles are fixed are used as the sensing material.

What is claimed is:

1. An $F_2$ gas sensing material tar gas sensors comprising carbon nanotubes in which lanthanum fluoride ($LaF_3$) nanoparticles in a powder form are fixed by a microwave treatment without using any electrolyte,
wherein a weight ratio of the $LaF_3$ nanoparticles and the carbon nanotubes is in a range of 9:1 to 1:9.

2. The $F_2$ gas sensing material of claim 1, wherein the carbon nanotubes comprise single-walled carbon nanotubes (SWCNTs).

3. The $F_2$ gas sensing material of claim 1, wherein the $LaF_3$ nanoparticles are fixed to inner and/or outer walls of the carbon nanotubes.

4. A method of fabricating the $F_2$ gas sensing material defined in claim 1, comprising:
(1) mixing $LaF_3$ nanoparticles in a powder form and carbon nanotubes; and
(2) subjecting the mixture obtained in step (1) to the microwave treatment to fabricate the carbon nanotubes for sensing $F_2$ gas in which the $LaF_3$ nanoparticles are fixed without using any electrolyte:
wherein a weight ratio of the $LaF_3$ nanoparticles and the carbon nanotubes is in a range of 9:1 to 1:9.

5. The method of claim 4, further comprising:
immersing the carbon nanotubes in which the $LaF_3$ nanoparticles are fixed in step (2) in an organic solvent, followed by agitating, filtering and drying the carbon nanotubes.

6. The method of claim 5, wherein the organic solvent comprises one or two or more selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene.

7. A gas sensor comprising the $F_2$ gas sensing material defined in claim 1.

8. A method of fabricating the gas sensor comprising the $F_2$ sensing material defined in claim 1, comprising:
forming a network of the $F_2$ gas sensing material on a substrate; and
forming electrodes on the substrate on which the network is formed.

9. The method of claim 8, wherein the substrate comprises a silicon substrate.

10. The method of claim 8, wherein the substrate comprises a silicon substrate having a silicon oxide film formed on a surface thereof.

11. The method of claim 8, wherein the forming of the network of the $F_2$ gas sensing material on the substrate is performed using one selected from a dipping method of dipping a substrate in a solution in which the $F_2$ gas sensing material is dispersed and removing the substrate from the solution or a spraying method of spraying a solution in which the $F_2$ gas sensing material is dispersed using an organic solvent.

12. The method of claim 11, wherein the solution in which the $F_2$ gas sensing material is dispersed comprises one or two or more selected from the group consisting of dichlorobenzene, ortho-dichlorobenzene, N-methyl-2-pyrrolidinone, hexamethylphosphoramide, monochlorobenzene, N,N-dimethylformamide, dichloroethane, isopropyl alcohol, ethanol, methanol, chloroform, and toluene.

13. The method of claim 11, further comprising:
irradiating the solution in which the $F_2$ gas sensing material is dispersed with ultrasonic waves.

* * * * *